(12) United States Patent
Kamel et al.

(10) Patent No.: US 8,301,377 B2
(45) Date of Patent: Oct. 30, 2012

(54) IMAGE NAVIGATION METHOD USING PARAMETRIC SYSTEMATIC ERROR CORRECTION

(75) Inventors: Ahmed Kamel, Los Altos, CA (US); Jonathan Sheffield, Menlo Park, CA (US); Mark McLaren, Redwood City, CA (US)

(73) Assignee: Space Systems/Loral, Inc., Palo Alto, CA (US)

( * ) Notice: Subject to any disclaimer, the term of this patent is extended or adjusted under 35 U.S.C. 154(b) by 201 days.

(21) Appl. No.: 12/800,450

(22) Filed: May 14, 2010

(65) Prior Publication Data

US 2010/0228481 A1 Sep. 9, 2010

Related U.S. Application Data

(62) Division of application No. 11/599,868, filed on Nov. 15, 2006, now abandoned.

(51) Int. Cl.
*G01C 21/00* (2006.01)

(52) U.S. Cl. ........ 701/523; 701/513; 701/518; 701/519; 701/534; 382/275; 382/309; 342/179; 356/139.01

(58) Field of Classification Search ................. 701/469, 701/472, 480, 494, 495, 496, 501, 502, 509, 701/510, 511, 512, 513, 514, 518, 519, 523, 701/530, 531, 534, 535, 536; 382/275, 251, 382/252, 309; 353/69; 342/179, 352, 357.2, 342/357.22, 357.23, 357.31, 357.4; 356/139.01–139.02

See application file for complete search history.

(56) References Cited

U.S. PATENT DOCUMENTS

| | | | | |
|---|---|---|---|---|
| 4,688,092 A | * | 8/1987 | Kamel et al. | 348/147 |
| 4,944,587 A | * | 7/1990 | Harigae | 356/139.01 |
| 5,745,869 A | * | 4/1998 | van Bezooijen | 701/513 |
| 6,373,043 B1 | * | 4/2002 | Rhoads | 250/208.1 |
| 6,577,929 B2 | * | 6/2003 | Johnson et al. | 701/4 |
| 6,859,170 B2 | * | 2/2005 | Devereux et al. | 342/357.29 |
| 7,298,905 B2 | * | 11/2007 | Kondo et al. | 382/190 |
| 7,860,617 B1 | * | 12/2010 | Gaylor et al. | 701/13 |
| 2002/0004691 A1 | * | 1/2002 | Kinashi et al. | 701/4 |
| 2004/0098178 A1 | * | 5/2004 | Brady et al. | 701/4 |
| 2005/0192719 A1 | * | 9/2005 | Sheikh et al. | 701/13 |
| 2006/0197837 A1 | * | 9/2006 | Flath et al. | 348/143 |
| 2008/0037614 A1 | * | 2/2008 | Douglas | 375/150 |
| 2008/0103695 A1 | * | 5/2008 | Whiting | 701/213 |

* cited by examiner

*Primary Examiner* — Hussein Elchanti
*Assistant Examiner* — Rami Khatib
(74) *Attorney, Agent, or Firm* — Kenneth W. Float

(57) ABSTRACT

A novel Parametric Systematic Error Correction (ParSEC) system is disclosed which provides improved system accuracy for image navigation and registration (INR). This system may be employed in any suitable imaging system and, more specifically, to all imaging systems that exhibit systematic distortion. The ParSEC system may be employed to any such system regardless of sensing type (remote or in situ) or imaging media (photon or charged particle) and is further applicable to corrected imaging of any celestial body currently detectable to remove distortion and systematic error from the imaging system employed. The ParSEC system of the instant invention comprises a software algorithm that generates at least about 12 correction coefficients for each of the INR system measurements such as stars, visible landmarks, infrared (IR) landmarks and earth edges. An iterative estimation algorithm such as, for example, least squares or Kalman filters may be employed to determine the at least about 12 correction coefficients from each set of measurement residuals. The improved image products provide more accurate weather forecasting such as wind velocity and temperature.

18 Claims, 6 Drawing Sheets

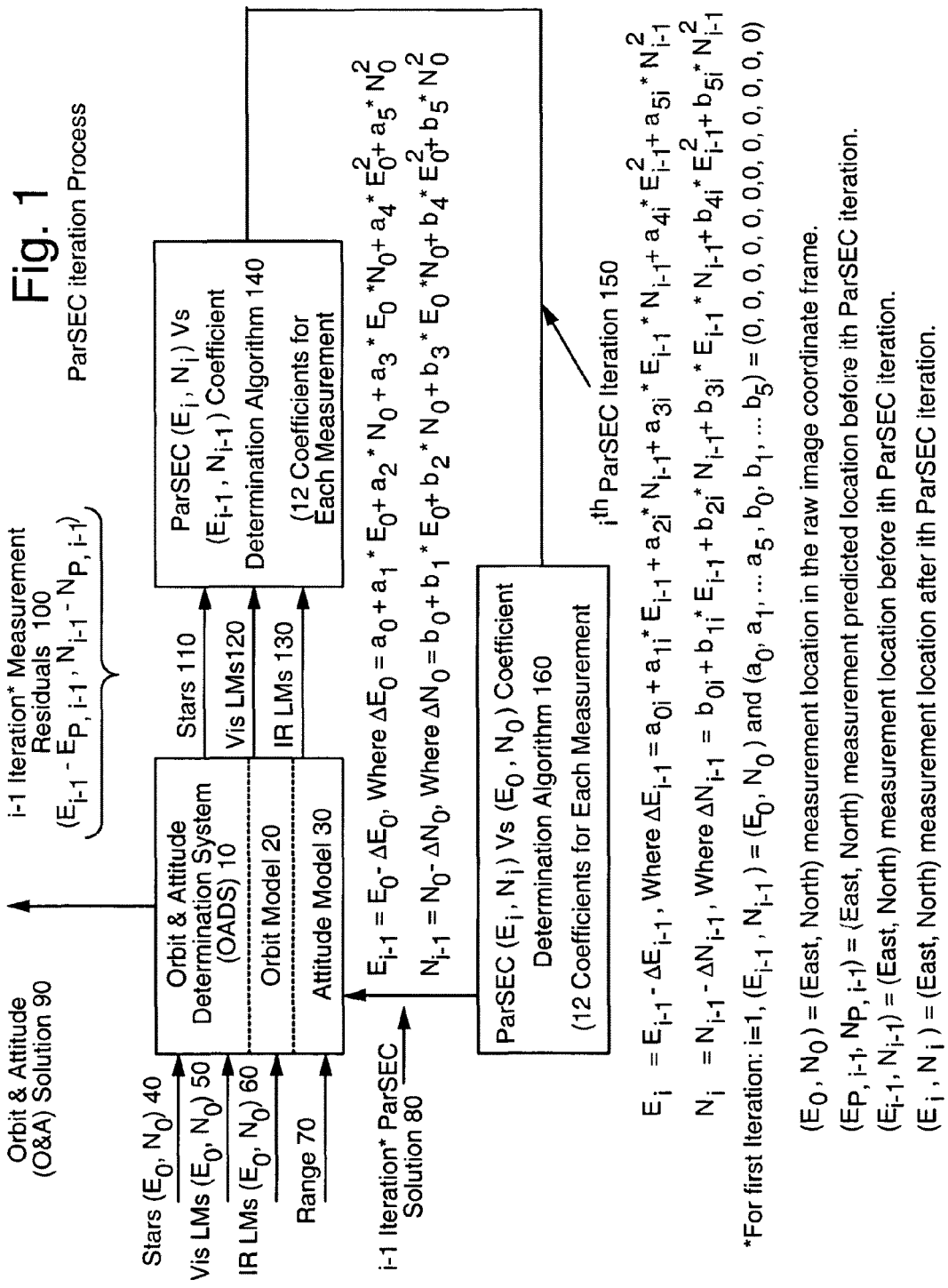

ParSEC i$^{th}$ Iteration Coefficients

For $i \geq 1$, ith ParSEC iteration is given by:

$E_i = E_{i-1} - F(E_{i-1}, N_{i-1}, \vec{Ca_0}) = E_0 - F(E_0, N_0, \vec{Ca_0})$. $N_i = N_{i-1} - F(E_{i-1}, N_{i-1}, \vec{Cb_i}) = N_0 - F(E_0, N_0, \vec{Cb_0})$ $F(E, N, C) = c_0 + c_1 E + c_2 N + c_3 E*N^2 + c_4 E + c_5 N^2$ $Ca_i = (a_{0i}, a_{1i}, ..., a_{5i})$, $Ca_0 = (a_0, a_1, ..., a_5)$, $Cb_i = (b_{0i}, b_{1i}, ..., b_{5i})$, $Cb_0 = (b_0, b_1, ..., b_5)$ $a_0 \leftarrow a_0 + \Delta a_0, \Delta a_0 = a_{0i} + a_0 a_{1i} + b_0 a_{2i}$, $a_1 \leftarrow a_1 + \Delta a_1, \Delta a_1 = a_{1i} + 2a_0 a_{4i} + a_1 a_{1i} + b_0 a_{3i} + b_1 a_{2i}$, $a_2 \leftarrow a_2 + \Delta a_2, \Delta a_2 = a_{2i} + a_0 a_{3i} + a_2 a_{1i} + 2b_0 a_{5i} + b_2 a_{2i}$, $a_3 \leftarrow a_3 + \Delta a_3, \Delta a_3 = a_{3i} + a_1 a_{3i} + 2a_2 a_{4i} + a_3 a_{1i} + 2b_1 a_{5i} + b_2 a_{3i} + b_3 a_{2i}$, $a_4 \leftarrow a_4 + \Delta a_4, \Delta a_4 = a_{4i} + 2a_1 a_{4i} + a_4 a_{1i} + b_1 a_{3i} + b_4 a_{2i}$, $a_5 \leftarrow a_5 + \Delta a_5, \Delta a_5 = a_{5i} + a_2 a_{3i} + a_5 a_{1i} + 2b_2 a_{5i} + b_5 a_{2i}$.

$b_0 \leftarrow b_0 + \Delta b_0, \Delta b_0 = b_{0i} + a_0 b_{1i} + b_0 b_{2i}$, $b_1 \leftarrow b_1 + \Delta b_1, \Delta b_1 = b_{1i} + 2a_0 b_{4i} + a_1 b_{1i} + b_0 b_{3i} + b_1 b_{2i}$, $b_2 \leftarrow b_2 + \Delta b_2, \Delta b_2 = b_{2i} + a_0 b_{3i} + a_2 b_{1i} + 2b_0 b_{5i} + b_2 b_{2i}$, $b_3 \leftarrow b_3 + \Delta b_3, \Delta b_3 = b_{3i} + a_1 b_{3i} + 2a_2 b_{4i} + a_3 b_{1i} + 2b_1 b_{5i} + b_2 b_{5i} + b_3 b_{2i}$, $b_4 \leftarrow b_4 + \Delta b_4, \Delta b_4 = b_{4i} + 2a_1 b_{4i} + a_4 b_{1i} + b_1 b_{3i} + b_4 b_{2i}$, $b_5 \leftarrow b_5 + \Delta b_5, \Delta b_5 = b_{5i} + a_2 b_{3i} + a_5 b_{1i} + 2b_2 b_{5i} + b_5 b_{2i}$.

($\Delta a_0, \Delta a_1, \Delta a_2, \Delta a_3, \Delta a_4, \Delta a_5, \Delta b_0, \Delta b_1, \Delta b_2, \Delta b_3, \Delta b_4, \Delta b_5$) = numerical adjustment of the previous ParSEC coefficients with current ParSEC (ith) iteration coefficients. Note that these adjustments are done numerically based on the above formulas. Note also that convergence is achieved when the deltas become insignificant.

Inverse ParSEC Correction

ParSEC correction :

$E' = E - \Delta E$ $N' = N - \Delta N$ $\Delta E = a0 + a1 * E + a2 * N + a3 * E * N + a4 * E^2 + a5 * N^2$ $\Delta N = b0 + b1 * E + b2 * N + b3 * E * N + b4 * E^2 + b5 * N^2$ Inverse ParSEC correction :

$E = E' + \Delta E'$ $N = N' + \Delta N'$ $\Delta E' = a0' + a1' * E' + a2' * N' + a3' * E' * N' + a4' * E'^2 + a5' * N'^2$ $\Delta N' = b0' + b1' * E' + b2' * N' + b3' * E' * N' + b4' * E'^2 + b5' * N'^2$ $a0' = a0 * (1 + a1 + a4 * a0) + b0 * (a2 + b0 * a5 + a0 * a3)$ $a1' = a1 + a1^2 + a2 * b1 + 2 * a0 * a4 + b0 * a3$ $a2' = a2 + a0 * a3 + a1 * a2 + a2 * b2 + 2 * a5 * b0$ $a3' = a3, \quad a4' = a4, \quad a5' = a5.$ $b0' = b0 * (1 + b2 + b0 * b5) + a0 * (b1 + b4 * a0 + b3 * b0)$ $b1' = b1 + a1 * b1 + b2 * b1 + 2 * a0 * b4 + b0 * b3$ $b2' = b2 + a0 * b3 + b1 * a2 + b2^2 + 2 * b5 * b0$ $b3' = b3, \quad b4' = b4, \quad b5' = b5.$ (E, N) = (East, North) pixel location in the raw image.

(E', N') = (East, North) pixel location in the corrected image.

(a0, a1, a2, a3, a4, a5, b0, b1, b2, b3, b4, b5) = ParSEC coefficients.

(a0', a1', a2', a3', a4', a5', b0', b1', b2', b3', b4', b5') = ParSEC inverse coefficients.

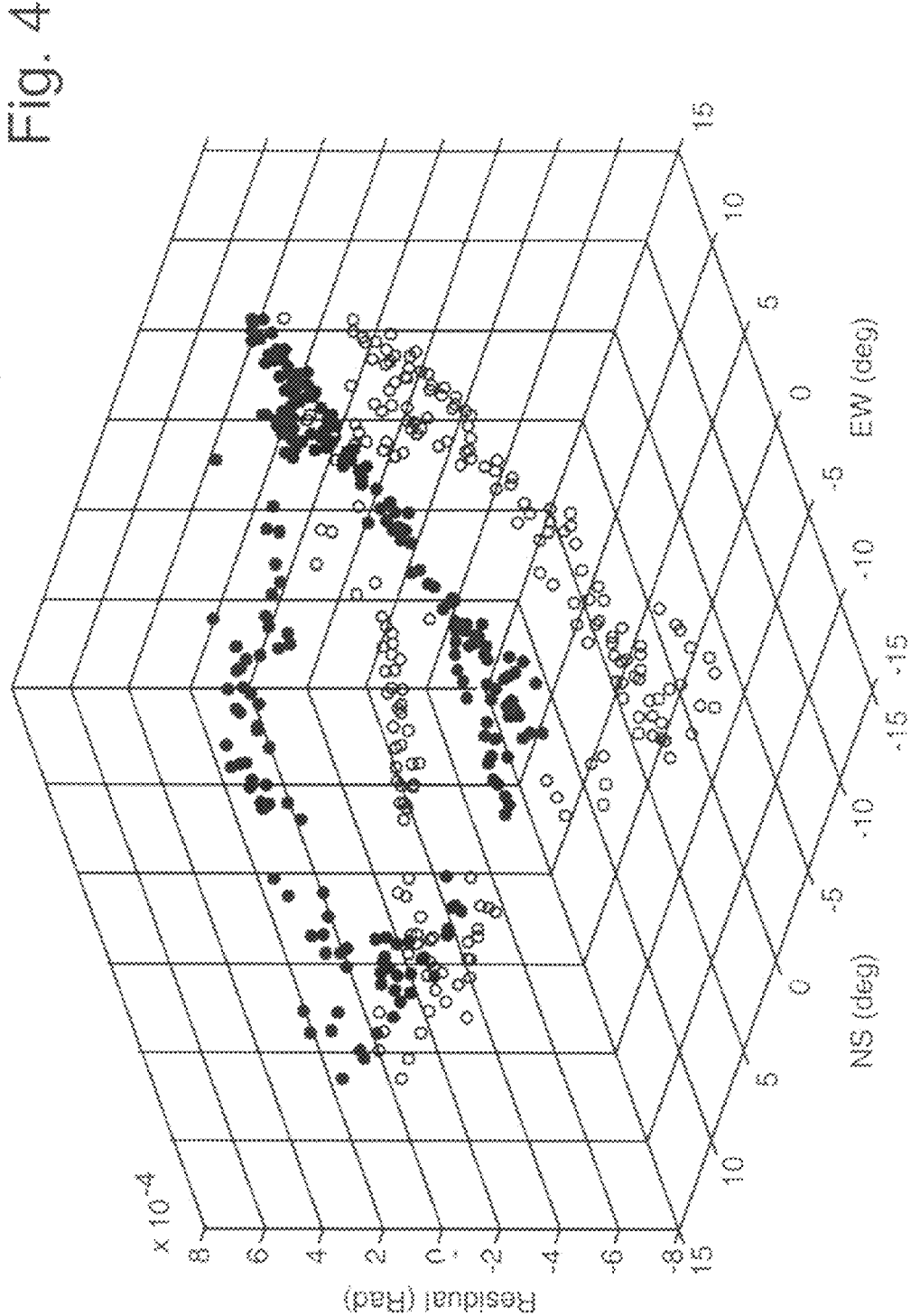

Fig. 5

Correction Terms $$\Delta E = a0 + a1*E + a2*N + a3*E*N + a4*E^2 + a5*N^2$$

$$\Delta N = b0 + b1*E + b2*N + b3*E*N + b4*E^2 + b5*N^2$$

Case 1: Stars in OADS*
Orbit and Attitude Solution (5/11/06 - 5/14/06)

| | |
|---|---|
| a0= -1.931E-5 | b0= -3.247E-5 |
| a1= 4.612E-4 | b1= 6.776E-5 |
| a2= -1.559E-5 | b2= 5.752E-5 |
| a3= -3.647E-3 | b3= -1.120E-3 |
| a4= -2.389E-4 | b4= 2.560E-3 |
| a5= 4.606E-4 | b5= -9.570E-4 |

Case 2: Stars in OADS* Attitude
Solution and Orbit from APS**

(5/11/06 - 5/14/06)

| | |
|---|---|
| a0= -7.406E-5 | b0= -1.601E-5 |
| a1= 4.496E-4 | b1= 5.340E-6 |
| a2= 1.275E-5 | b2= 8.274E-5 |
| a3= -3.491E-3 | b3= -1.167E-3 |
| a4= -3.488E-4 | b4= 2.033E-3 |
| a5= 3.163E-4 | b5= -8.277E-4 |

\* OADS: Orbit and Attitude Determination System

\*\* APS Analysis and Planning System

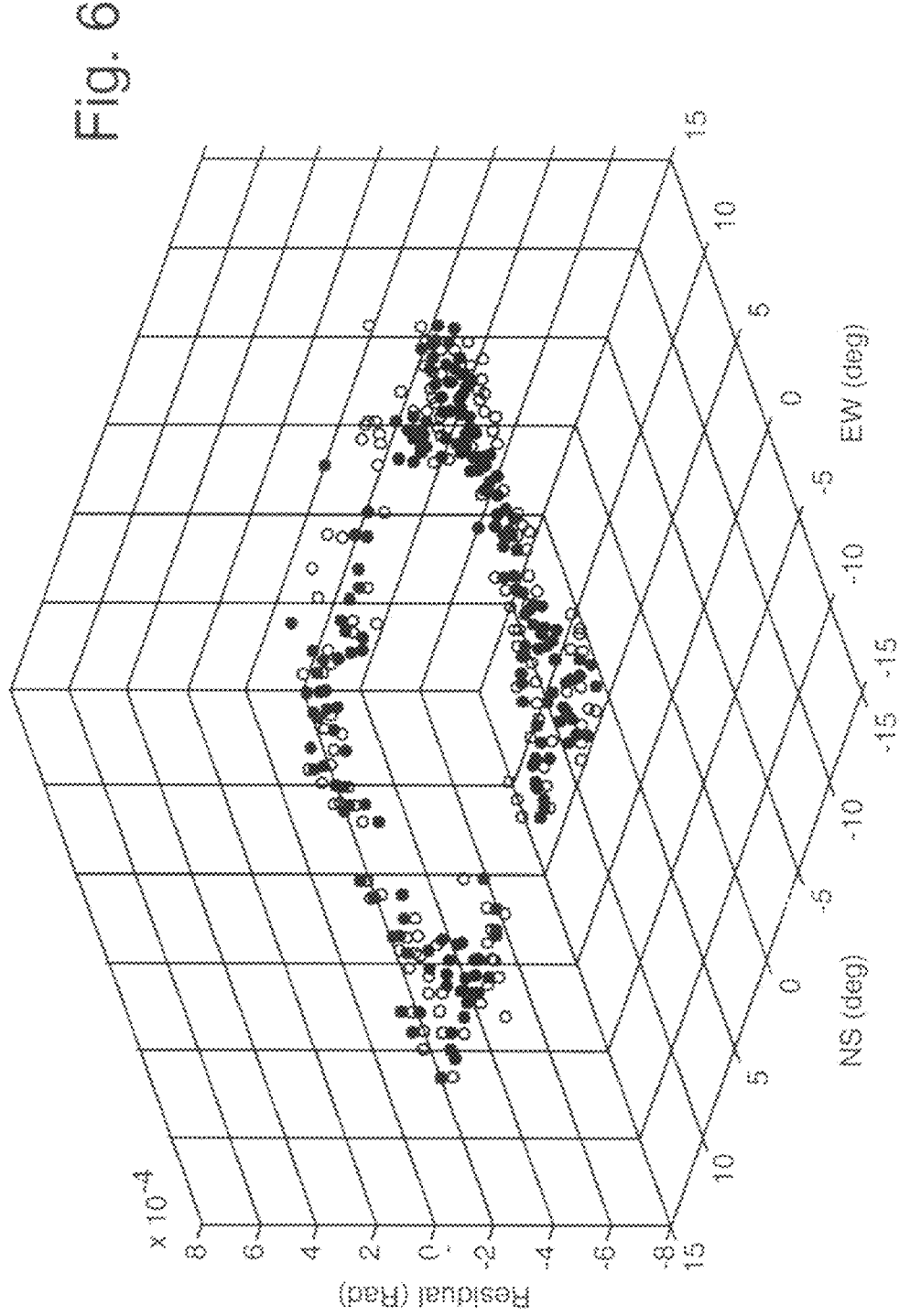

IMAGE NAVIGATION METHOD USING PARAMETRIC SYSTEMATIC ERROR CORRECTION

CROSS-REFERENCE TO RELATED APPLICATIONS

This is a divisional of U.S. patent application Ser. No. 11/599,868, filed Nov. 15, 2006 now abandoned.

FIELD OF THE INVENTION

This his invention relates to methods and systems for making global observations of the earth and, more particularly, to image navigation and registration (INR) systems. More particularly, the present invention is directed to methods, apparatus and systems that provide real time coverage of at least 70% of the observable earth surface to improve the accuracy of INR systems.

BACKGROUND OF THE INVENTION

It is known that spacecraft, aircraft and satellites must accurately determine absolute orientation (i.e., roll, pitch and yaw) to realign their onboard attitude control system (ACS) and correct for instrument drift and buildup of errors affecting accurate and precise attitude determination. Attitude control is of particular importance in aircraft to maintain a stable operating environment, in surveillance satellites to track another object in space, and in remote imaging satellites to provide precise earth imaging and reconnaissance.

In the western hemisphere, weather forecasting methods rely heavily on data supplied by the Geostationary Operational Environmental Satellites (GOES series), operated by the National Oceanic and Atmospheric Administration (NOAA). The GOES series was developed from the prototype "advanced technology systems" 1 and 3 (ATS-1,-3) launched in 1966 and 1967, respectively. These and all subsequent systems have been implemented with scanning imaging systems that are able to produce full disk images of the earth at one km resolution for visible channel and four km resolution for infrared channels in about 20-30 minutes.

Prior methods have been developed to perform ACS functions. One such method, for example, measures angular positions of stars and compares those measurements to known quantities. In U.S. Pat. No. 5,963,166, Kamel teaches providing a spacecraft camera image navigation and registration (INR) system to point a satellite and camera. Therein an onboard computer performs calculations based upon information from a star tracker, gyro, and earth based sensor data to determine the attitude of the satellite. Kamel employs the use of star tracker equipment to detect stars in the everchanging area above the satellite. The star tracker compares detected star positions with a star table and then determines vehicle attitude from the detected star positions. Star trackers provide attitude accuracy on the order of 5-20 microradians. The star tracker equipment required to detect the faint star light and maintain the star tables may be costly.

In Ring U.S. Pat. No. 5,959,576 there is disclosed a satellite attitude determination system using a global positioning system ("GPS") and line of sight communication instead of star tracker equipment. Ring provides a dual access pointing laser receiver on one satellite and laser transmitters on other satellites to determine relative azimuth and elevation. The relative orientation is combined with global navigation satellite systems ("GNSS") position data to determine the attitude of the satellite. Ring provides attitude determination for a communication satellite without the use of star tracker equipment. However, Ring's design concept provides coarse attitude accuracy using radar signals not suitable for applications requiring greater accuracy, such as remote imaging or surveillance satellites. Although Ring provides accurate attitude determination employing laser communication links, it potentially represents a very complex and costly system.

In Van Dusseldorp U.S. Pat. No. 5,943,008 exemplifies an attitude determining system utilizing a GPS. According to Van Dusseldorp, at least three sets of signals are respectively received from three antennas on board a vehicle. Each signal is received in a separate time domain slot, with each signal respectively receiving information from a respective satellite and a separate dedicated channel.

However, it is found that multiple antenna GPS systems provide relatively coarse attitude accuracy on the order of 1 mille radiant at best and therefore may not be used in applications requiring greater accuracy, such as in remote imaging satellites or surveillance satellites.

Techniques such as these and existing interferometric GPS attitude determination methods employing multiple antennas are complex, expensive and provide only coarse information with milliradian accuracy.

The newest of the GOES satellites (GOES-E located at 75° west longitude and GOES-W located at 135° west longitude) are 3-axis stabilized and configured to observe the earth with one panchromatic visible and four infrared imaging systems per satellite. The visible imaging systems use a "flying spot" scanning technique when a mirror moving in two axes East-West and North-South scans a small vertically oriented element of the fully viewable scene (the instrument's full area of regard) across an array of eight vertically arranged silicon pixels. The individual pixel field of view is about 30 microradians. Each scene element is sampled for just under 50 microseconds in order to support this slow scanning method. The GOES satellites payload stability must be extraordinarily high so that almost no relative motion occurs between any one scan line of the samples. Accordingly, the payload pointing does not nominally deviate further than one-third of a pixel during an entire one-second duration scan. Since there are over 1,300 scan lines to create a full disk image, it takes about 22 minutes to create the full image. Operationally a full disk sampling technique is actually done once every three hours to allow more frequent coverage of an entire visible hemisphere rather than a more frequent sampling of smaller regions.

During normal operation, GOES series satellites provide gray-scale and infrared images of different portions of the earth at between 5, 15 and 30-minute intervals. Limited regions may be sampled as frequently as about once per minute during "super rapid scan operations" (SRSO). In practice, SRSO operations are rarely used because coverage of other areas is too important to be neglected for long periods of time. Moreover, significant earth based events that occur during lapses in coverage of a particular region may be missed. In other words, the satellite's sensor may be looking at an uneventful portion of the earth's surface when the significant activity is occurring at another portion of the earth's surface. Furthermore, phenomena that may occur a night can only be seen in the infrared channels which have a much coarser spatial resolution than the visible channel and otherwise are subject to the same limitations that are inherent in a scanning system.

GOES satellites provide a system that is optimized for monitoring cloud motion, but is far less suitable for observing other GEO physical events. At visible wavelengths, clouds are efficient diffuse mirrors of solar radiation and therefore appear white with variations of brightness seen as shades of gray. Color, enhancing the contrast and visibility of the earth's surface background, may actually detract from cloud visibility in a scene. Moreover, adding color may triple the amount of information and thus the size of a digitized image, which creates a burden on the transmission demands for the broadcast portion of the satellite system. Furthermore, observations of significant but perhaps transient phenomena that occur in time scales of seconds or minutes (such as volcanoes, lightening strikes or meteors) may be late or not observed at all. Accordingly, the information provided from systems such as the GOES system, although reliable, would, if enhanced, be able to provide a high resolution "watchdog" service that reliably reports real-time information over a significant portion of the earth's surface. Also, in other systems for example, "video" style loops created from successive images having relatively coarse temporal resolution may lack the continuity needed to provide truly reliable information if cloud movements between image samples are much greater than a pixel dimension. The temporal coherence among the pixels of a scanned image and between the co-registered pixels of successive images will degrade as the time required to create the image and the elapsed time interval between scans increases. These effects may have adverse impact on the fidelity of any "image" created to represent the state of the earth at a given moment, but particularly to attempts to build animations using successive co-registered scanned images of a given area.

Various other weather satellites, in addition to the GOES satellites, include a Japanese weather satellite, MTSAT-1R located at about 140° east longitude exhibiting a coverage area that covers the Southeast Asia and Australian areas of the world. The Chinese FY (Feng-Yang) satellite is located at 105° east longitude and shows a substantially overlapping coverage with the MTSAT-1R satellite. The METEOSAT series of the European space agency with METERSAT-8 located near 0° east longitude and requires a license to decrypt and thus limits distribution for three days after observation. In contrast, the GOES, MTSAT-1R and FY satellites have open reception and distribution via NASA funded Internet links. Other satellites that perform similar operation include the Indian INSAT ID, INSAT-2 series, and KALPANA which are located near 74° and 93.5° east longitude, and the Russian system, GOMS/ELECTRO, which is located near 77° east longitude and has been out of service since September 1998. A common feature of these different systems is that they employ a spin stabilized or 3-axis stabilized satellites and imaging systems that require 20 minutes or longer to acquire a full disk image of the earth. Furthermore, the systems use the long scan period to provide a variety of spatial resolutions but all of which are coarser than 1 km at the Nadir point.

There have been a number of proposals made in the past by various individuals and groups to place a camera on a large commercial communication satellite positioned in GEO. In each case, the camera would operate as a parasitic device, in that the camera would use the power and communication subsystem of the satellite to support its operational requirements. The most recent and detailed proposals were made by Hughes Information Technology Corporation, a former subsidiary of Hughes Aircraft Company and the MITRE Corporation. These proposals are discussed below.

The Hughes proposal was described under various names such as "EarthCam", "StormCam" and "GEM" (GEOstationary Earth Monitor) and involved a television style imaging system using a two dimensional charge coupled device (CCD) detector array to create an image of 756 pixels wide by 484 pixels high at intervals that range from between two minutes to eight minutes. The frame rate for this TV-style camera was determined by compression limitations in the satellite's meager 1-5 Kbps housekeeping data channel capacity. The Hughes proposal described placing a digital camera on board one or more of Hughes' commercial telecommunication satellites (COMSAT). This parasitic camera was to operate using power provided by the COMSAT and deliver data to a Hughes ground operation center by way of a very low data rate housekeeping telemetry link. Data was then to be distributed to various users from this single command and control facility.

The system proposed employing cameras placed on board the Hughes satellites to be located at 71° west, 101° west, 30° east and 305° east longitude. Upon receipt and after processing, data would be distributed via landline or communication satellite links to end users. The single visible imaging system would operate with a zoom mode so as to achieve 1 km spatial resolution while building a composite hemispheric view from lower resolution images.

As presently recognized, the system proposed by Hughes was deficient in both its camera resources and communication systems infrastructure with regard to the following three attributes. The system proposed by Hughes did not provide real-time images as a result of the delay between frames. Another deficiency was that real-time images cannot be distributed in real time, due to the interval between frames and the slow data rate, as well as the single point data reception and distribution facility. Furthermore, the system proposed by Hughes was deficient in its inability to provide hemispheric (full disk images) in real time. This limitation is due to the limited telemetry channel capacity, limited camera design and the time required to create a composite full disk image. Accordingly, the system proposed by Hughes neither appreciated the significance of providing an infrastructure that would be able to provide real-time images, distribute the real-time images, and provide for the compilation of a composite full disk images in real time.

In 1995, the MITRE Corporation published a study that was performed in 1993. The study examined the use of parasitic instruments on commercial communications satellites for the dual purpose of augmenting government weather satellites and providing a mechanism for low cost test and development of advanced government environmental monitoring systems. This study examined in some detail the application of newly developed megapixel, two-dimensional, CCD arrays to GEOstationary imaging systems and concluded that considerable gains in capacity could be achieved used the CCD arrays. Although the advent of CCD arrays as large as 4096×4096 was anticipated at the time the study was performed, the authors recognized that an array of 1024×1024 was the largest practical size available for application at that time.

Two distinct types of CCD array applications were considered, time delay integration (TDI) and "step-stare", as alternatives to the traditional "spin-scan" or "flying-spot" imaging techniques. The TDI approach can be viewed as a modification of the "flying-spot" in that it uses an asymmetrical two-dimensional array, e.g., 128×1024, oriented with the long axis vertical so as to reduce the number of East-West scans. In this technique, every geographic scene element is sampled 128 times, which increases the signal-to-noise level. However, communication satellites are relatively unstable platforms. With a single pixel integration time on the order of milliseconds, spacecraft movement during the accumulation of over 100 samples may degrade the spatial resolution within any one scene element. This effect, which is in addition to the navigation and registration degradation due to scan line shift, is called "pixel spread". Image spread over long integration periods also degrades or precludes low illumination or night observing at visible wavelengths.

The "step-stare" approach was identified in the MITRE study as being the preferred technique. A large, two-dimensional CCD array in this technique is used to capture a portion of the image of the earth. The optical pointing is incrementally "stepped" across the face of the earth by an amount nearly equal to its field of regard at each step. The overlap ensures navigational continuity and registration correctness. With reasonable, but not extraordinary, satellite stability, the frame time may be increased to milliseconds so as to achieve required levels of sensitivity with compromising navigational or registration criteria or image quality.

The MITRE study proposes the use of sub-megapixel arrays (1024×512). With a dwell time per frame of approximately 150 milliseconds, an entire composite full earth disk image at 500-meter spatial resolution could be created from a mosaic of nearly 1,200 frames in relatively few minutes. The maximum exposure time to create an image in daylight is much shorter than 150 milliseconds for most CCD arrays. Furthermore, a reasonably stable satellite undergoes little motion during such a brief time interval thus reducing pixel spread. In order to ensure coverage of the entire earth's surface, frames are overlapped by an amount defined by the satellite stability. This step-stare technique steps the frames in a line from North to South or from East to West, simultaneously exposing all pixels in an array. This ensures accurate registration and navigation of image pixels.

According to the MITRE study, the time between frames in a 500-meter resolution mosaic image of the earth is three minutes (equal to the time needed to create the mosaic). As presently recognized, during this three-minute interval the motion of objects observed, such as clouds and smoke plumes, will cause the object's apparent shape to change in a discontinuous fashion. The continuity of successive observations will thus be compromised and degrade "seamless" coverage by an amount proportional to the velocities of the objects causing the shapes to apparently change. This degradation is called image smear and becomes more apparent as the time between frames increases image smear, thus putting a premium on decreasing the time to create a mosaic of the full disk image.

As presently recognized, with sufficient stability it is possible for a CCD imaging system to allow the shutter to remain open to collect more light to enhance low illumination performance. The impact of CCD arrays in a step-stare scan on night imaging is not noted in the MITRE study. Low illumination imaging is possible by reducing the stepping rate and allowing the camera field to dwell on the area of regard for a predetermined amount of time while integrating its emitted light. At the time of the MITRE study, time exposures to achieve night imaging capability would have increased the time to acquire a full disk image of the earth to about 24 minutes, or about the same amount of time as the flying spot technique. Furthermore, the significance of obtaining real-time night images or the mechanisms needed to obtain the images was never appreciated and thus not realized. In the MITRE study, data distribution was accomplished either by embedding a low data rate in the spacecraft telemetry or directly to receive sites by preempting the use of one of the satellite's transponders. While the emphasis was on rapid full disk imaging, no special considerations were given to disseminate the data either live or globally.

In 1995 the Goddard Space Flight Center announced a study called the "GEO Synchronous Advanced Technology Environmental System" (GATES) that was expected to lead the development of a small satellite system equipped with a "push broom" scanning linear CCD array imaging device. This system was to use motion induced by the satellite's attitude control system to make successive scans of the visible earth's disk. The satellite's attitude control momentum wheels would be used to slew the entire system back and forth 12 times while the field of regard of the camera's linear array is stepped from North to South to achieve a full disk scan in about 1o minutes. This system uses a 1,024 pixel long one-dimensional linear CCD array "flying spot" similar to, but much longer than, the GOES eight pixel array.

As presently recognized, limitations of the GATES system are that neither live images nor night imaging is possible. Data was distributed from a single receive site via the Internet. A limitation common to the Hughes proposed system, the MITRE system and the GATES system is that none of the systems appreciate the interrelationship between providing a real-time continuous monitoring capability of the entire earth that is accessible from a geostationary earth orbit while providing high-resolution images. In part, the limitation with all of the devices is that none of the devices would be able to reliably provide the "watchdog" high resolution imaging function that would provide a remote user with valuable real-time data of dynamic situations occurring at or near the earth's surface.

In U.S. Pat. No. 4,688,091 to Kamel et al, filed May 6, 1986, issued Aug. 18, 1987, there is disclosed a system for achieving spacecraft camera image registration comprising a portion external to the spacecraft and an image motion compensation system (IMCS) portion onboard the spacecraft. Within the IMCS, a computer calculates an image registration compensation signal that is sent to the scan control loops of the onboard cameras. At the location external to the spacecraft, the long-term orbital and attitude perturbations on the spacecraft are modeled. Coefficients from this model are periodically sent to the onboard computer by means of a command unit. The coefficients take into account observations of stars and landmarks made by the spacecraft camera themselves. The computer takes as inputs the updated coefficients plus synchronization information indicating the mirror position of each of the spacecraft cameras, operating mode, and starting and stopping status of the scan lines generated by these cameras, and generates in response thereto the image registration compensation signal. The sources of periodic thermal errors on the spacecraft are discussed. The system is checked by calculating "measurement residuals", the difference between the landmark and star locations predicted at the external location and the landmark and star locations as measured by the spacecraft cameras.

Therein it is also disclosed that U.S. Pat. No. 3,952,151 discloses a method and apparatus for stabilizing an image produced by, for example, a camera on board a satellite by sensing the instantaneous attitude displacement of the satellite and using these signals to adjust the image generating beam at the ground station.

Thereafter there are disclosed secondary patent references, U.S. Pat. Nos. 3,223,777, 3,676,581, 3,716,669, 3,769,710, 3,859,460, 4,012,018, and 4,300,159.

In U.S. Pat. No. 4,688,092 to Kamel et al, filed May 6, 1986, issued Aug. 18, 1987, there is disclosed that pixels within a satellite camera image are precisely located in terms of latitude and longitude on a celestial body, such as the earth, being imaged. A computer on the earth generated models of the satellite's orbit and attitude, respectively. The orbit model is generated from measurements of stars and landmarks taken by the camera and by range data. The orbit model is an expression of the satellite's latitude and longitude at the sub-satellite point, and of the altitude of the satellite, as a function of time, using as coefficients the six Keplerian elements at epoch. The attitude model is based upon star measurements taken by each camera. The attitude model is a set of expressions for the deviations in a set of mutually orthogonal reference optical axes as a function of time, for each camera. Measured data is fit into the models using a walking least squares fit algorithm. A transformation computer transforms pixel coordinates as telemetered by the camera into earth latitude and longitude coordinates using the orbit and attitude models.

In U.S. Pat. No. 5,963,166 to Kamel, filed Jul. 23, 1998, issued Oct. 5, 1999, there is disclosed a precise spacecraft camera image navigation and registration system and method wherein a computer on board the spacecraft and a ground system comprising at least two ground stations precisely compute image navigation and registration data from precise data measurements. The computer on board the spacecraft (spacecraft control system) uses precise star tracker, gyro, and earth sensor attitude data to precisely point the spacecraft and the camera. The ground system utilizes precise star measurement data from the camera and range data from the ground stations time tagged with GPS precise clock data. The ground system uses these precise measurements to determine precise orbit and attitude coefficients and uploads these coefficients to the spacecraft. The computer on board the spacecraft uses these precise coefficients to generate and apply precise signals to compensate for slow orbit and attitude variations and register camera images in real time. The computer on board the spacecraft is also used to generate camera commands to eliminate the need to upload a large number of daily ground commands, which therefore simplifies ground operations.

In U.S. Pat. No. 6,023,291 to Kamel et al, filed Sep. 29, 1997, issued Feb. 8, 2000, there is disclosed a method and system for imaging a celestial object, typically the Earth, with a spacecraft orbiting the celestial object. The method includes steps of (a) operating an imager instrument aboard the spacecraft to generate data representing an image of the celestial object; (b) processing the image data to derive the location of at least one predetermined landmark in the image and a location of edges of the celestial object in the image; and (c) further processing the detected locations to obtain the attitude of the imager instrument. The method includes a further step of outputting the image and the imager instrument attitude to at least one end-user of the image, and/or using the imager instrument attitude to revise the image before outputting the image to the at least one end-user of the image. The generated data preferably represents a one half frame image, and the steps of processing and further processing thus occur at a one half frame rate. The step of processing includes a step of applying the a priori knowledge of the attitude coefficients in processing new observations to determine the imager current attitude.

In U.S. Pat. No. 6,271,877 to LeCompte, filed Jun. 25, 1999, issued Aug. 7, 2001, there is disclosed a system, method and apparatus for collecting and distributing real-time, high resolution images of the earth from GEO include an electro-optical sensor based on multi-megapixel two-dimensional charge coupled device (CCD) arrays mounted on a geostationary platform. At least four, three-axis stabilized satellites in geostationary earth orbit (GEO) provide worldwide coverage, excluding the poles. Image data that is collected at approximately one frame/sec is broadcast over high-capacity communication links (roughly 15 MHZ bandwidth) providing real-time global coverage of the earth at sub-kilometer resolutions directly to end users. This data may be distributed globally from each satellite through a system of space and ground telecommunication links. Each satellite carries at least two electro-optical imaging systems that operate at visible wavelengths so as to provide uninterrupted views of the earth's full disk and coverage at sub-kilometer spatial resolutions of most or selected portions of the earth's surface.

In U.S. Pat. No. 6,331,870 to LeCompte, filed May 21, 2001, issued Dec. 18, 2001, there is disclosed a system, method and apparatus for collecting and distributing real-time, high resolution images of the earth from GEO include an electro-optical sensor based on multi-megapixel two-dimensional charge coupled device (CCD) arrays mounted on a geostationary platform. At least four, three-axis stabilized satellites in geostationary earth orbit (GEO) provide worldwide coverage, excluding the poles. Image data that is collected at approximately one frame/sec is broadcast over high-capacity communication links (roughly 15 MHZ bandwidth) providing real-time global coverage of the earth at sub-kilometer resolutions directly to end users. This data may be distributed globally from each satellite through a system of space and ground telecommunication links. Each satellite carries at least two electro-optical imaging systems that operate at visible wavelengths so as to provide uninterrupted views of the earth's full disk and coverage at sub-kilometer spatial resolutions of most or selected portions of the earth's surface.

In U.S. Pat. No. 6,463,366 to Kinashi et al, filed Mar. 12, 2001, issued Oct. 8, 2002, there is disclosed an attitude determination and alignment method and system use electro-optical sensors and global navigation satellites to determine attitude knowledge for a spacecraft, satellite or a high-altitude aircraft. An onboard inertial navigation system uses global navigation satellite system equipment and an attitude determination system uses an electro-optical sensor. The electro-optical sensor views the navigation satellites as surrogate stellar reference sources. The electro-optical sensor replaces the function of a star sensor or tracker and associated processing required for an onboard attitude determination system. Navigation and timing information generated by the GPS/GNSS-INS is used to perform required attitude determination system functions.

In U.S. Pat. No. 6,504,570 to LeCompte, filed Nov. 26, 2001, issued Jan. 7, 2003, there is disclosed a system, method and apparatus for collecting and distributing real-time, high resolution images of the earth from GEO include an electro-optical sensor based on multi-megapixel two-dimensional charge coupled device (CCD) arrays mounted on a geostationary platform. At least four three-axis stabilized satellites in geostationary earth orbit (GEO) provide worldwide coverage, excluding the poles. Image data that is collected at approximately one frame/sec is broadcast over high-capacity communication links (roughly 15 MHZ bandwidth) providing real-time global coverage of the earth at sub-kilometer resolutions directly to end users. This data may be distributed globally from each satellite through a system of space and ground telecommunication links. Each satellite carries at least two electro-optical imaging systems that operate at visible wavelengths so as to provide uninterrupted views of the earth's full disk and coverage at sub-kilometer spatial resolutions of most or selected portions of the earth's surface.

There is therefore a demonstrated need to provide improved INR systems that are devoid of the above-noted deficiencies.

OBJECTS OF THE INVENTION

It is therefore an object of this invention to provide an improved INR system for imaging systems that exhibit systematic distortion.

Another object of this invention is to provide an improved INR imaging system employing a Parametric System Error Correction (ParSEC) system.

Yet another object of this invention is to eliminate the effects of systematic errors in INR systems without requiring costly engineering directed to discovering and correcting actual sources of errors.

Yet again another object of this invention is to provide an improved INR system that provides accuracy of the coastline fixed grid overlays to better match the coastlines in the actual earth images taken by a camera on a moving satellite.

Yet another object of this invention is to provide an improved INR system which fits measurement residuals employing an algorithm to determine the best estimate for each type of measurement; i.e., star, visible landmark, IR landmark and earth edges.

Yet again another object of this invention is to provide an improved INR system that corrects the East-West and North-South location of the actual star, visible landmark, IR landmark and earth edges resulting in improved orbit and attitude determination.

Again another object of this invention is to apply an algorithm to INR systems that corrects the location of the raw visible imagery pixels to better match the fixed coastline overlay grid and achieve more accurate geo-location and image products.

A further object of this invention is to provide a correcting algorithm which employs IR landmarks to accurately determine the location of the raw IR imagery pixels in order to better match the fixed coastline overlay grid in image products.

Yet again a further object of this invention is to provide an improved INR system employing a unique algorithm whose coefficients may be applied in reverse to determine the raw image pixel location corresponding to a fixed pixel location in the image products and/or modify future expected star observation locations in order to better predict a star's location in lieu of adverse systematic errors affecting the imager.

BRIEF SUMMARY OF THE INVENTION

These and other objects of the instant invention are accomplished generally speaking by providing an improved INR method and system for imaging systems that exhibit systematic distortion comprising employing a novel algorithm system that effects improved accuracy of INR. The novel algorithm system of the instant invention employs a ParSEC system comprising at least about twelve (12) correction coefficients in either constant or time varying values for each of the INR systems measured, including those relating to stars, visible landmarks, IR landmarks and earth edges. The at least about 12 coefficients are determined on a case-by-case basis and, for example, could include at least about 12 coefficients where at least one coefficient is zero providing for a net number of coefficients to be employed in the system of the instant invention that numerically is less than 12. The at least about 12 coefficients are determined by an iterative estimation algorithm from each set of the measured residuals. The measured residuals are defined as the difference between the actual measurement of East-West and North-South coordinates from imagery data and the predicted East-West and North-South coordinates based on orbit and attitude solution. The at least 12 coefficients are applied for each set of measurements to correct the measured residuals which result in, for example, improved orbit and attitude determination process and remapping of raw image pixels to better match the fixed coastline grid to the actual coastline in the user's image products. Examples of such users' products include high rate information transmission (HRIT) and low rate information transmission (LRIT). These improved image products are found to provide inter alia more accurate weather forecasting with regard to wind velocity and temperature.

The ParSEC system of the instant invention is shown to be applicable in general form to all imaging systems that exhibit systematic distortion, regardless of sensing type (remote or in situ) or imaging media (photons or charge particles). With respect to remote sensing in space, ParSEC implementation is not limited to stars and earth landmarks. The ParSEC imaging system of the instant invention may be applied to any celestial body currently detectable to remove distortion and systematic error from a given imaging system.

Thus it is found in one embodiment that the ParSEC system of the instant invention may be an algorithm used to generate at least about 12 correction coefficients for each of the INR system measurements, such as stars, visible landmarks, infrared landmarks and earth edges.

In this embodiment of the instant invention, an iterative estimation algorithm, such as least squares or Kalman filter, is used to determine the at least about 12 correction coefficients from each set of measurement residuals which are hereinabove defined as the difference between the actual measurement of East-West and North-South coordinates from imagery data and the predicted East-West and North-South coordinates based on orbit and attitude solution.

The improved INR system and method of the instant invention may be employed in imaging systems exhibiting systematic distortion including those prior art INR systems hereinabove recited, and preferably those related to the GOES system in inter alia U.S. Pat. Nos. 4,688,091, 4,688,092 and 5,963,166.

BRIEF DESCRIPTION OF THE DRAWINGS

The above set forth and other features of the instant invention are made more apparent in the ensuing Detailed Description of the Invention when read in conjunction with the accompanying drawings, wherein:

FIG. 1 depicts the iteration approach to determine the 12 ParSEC coefficients for each measurement type;

FIG. 2 depicts the ParSEC calculation approach to determine the 12 ParSEC coefficients after iteration;

FIG. 3 depicts the inverse of the ParSEC algorithm to convert pixel location in the processed image to its location in the raw image;

FIG. 4 depicts an example of the star measurement residuals before ParSEC which clearly illustrates significant distortion due to systematic errors;

FIG. 5 depicts the optimal ParSEC coefficients obtained from the star measurement residuals using least squares algorithm; and FIG. 6 depicts the star measurements residuals after ParSEC, clearly demonstrating that systematic errors have been eliminated.

DETAILED DESCRIPTION OF THE INVENTION

In FIG. 1 there is depicted a block diagram of the method and system of the instant invention. Therein there is seen the ParSEC iteration process of the instant invention wherein coordinate data for stars ($E_o$, $N_o$), visible and IR landmarks ($E_o$, $N_o$) and range are transmitted to an orbit and attitude determination system (OADS) (10). The OADS output is directed to an orbit and attitude solution (O&A) (90) and (100) which contains the iteration measurement residuals $E_{i-1}-E_{p,i-1}$, $N_{i-1}-N_{p,i-1}$ relating to stars ($E_o$, $N_o$), and visible and IR landmarks ($E_o$, $N_o$) to be processed by the ParSEC ($E_i$, $N_i$) vs. ($E_{i-1}$, $N_{i-1}$) coefficient determination algorithm (140) of the instant invention. The ParSEC coefficients are thus generated (150) representing the ith ParSEC iteration which is inputted to the ParSEC $E_iN_i$ vs. $E_o$, $N_o$ coefficient determination algorithm (160). The output from (160) is then inputted as the i−1 iteration ParSEC solution (80) to the OADS (10) to improve the O&A solution (90) and the measurement residuals (100) to (130).

The Orbit & Attitude Determination System (OADS) (10) determines the satellite orbit and attitude using an orbit model (20) and an attitude model (30). The OADS (10), orbit model (20) and attitude model (30) are defined in equations found in U.S. Pat. No. 4,688,092. The OADS contains an estimation algorithm, for example, walking least square as defined in U.S. Pat. No. 4,688,092, sequential least squares or Kalman filter, that processes the stars (40), visible landmarks (50), infrared (IR) landmarks (60), and range (70) measurements to determine the Orbit and Attitude (O&A) solution (80) needed for INR as provided in the instant invention. An accurate O&A and INR are essential for accurate weather forecasting including wind velocity calculation from cloud motion prediction.

The orbit model (20) represents the differential equations relating the satellite position and velocity to the gravitational field of the earth, the moon, the sun and the direct solar radiation pressure on the satellite surface. These well known equations appear in, for example, the text "Statistical Orbit Determination" by Byron D. Tapley et al, published by Elsevier Press.

The attitude model (30), as defined, for example, in U.S. Pat. No. 4,688,092, represents the equations describing the thermal distortion due to the imaging system optical components exposure to the sun and the spacecraft orientation error due to the satellite control system tolerances.

The star measurements (40) represent the (East, North) angular location ($E_o$, $N_o$) of stars sensed by the imaging system. The ($E_o$, $N_o$) coordinates are determined by employing conventionally available processes known to those skilled in the art as defined in, for example, U.S. Pat. No. 4,746,976 from processing the star measurement data either on the ground or onboard the satellite in order to determine the peak of the star signal as defined in, for example, U.S. Pat. No. 4,688,092.

The visible landmark measurements (50) represents the (East, North) angular location ($E_o$, $N_o$) of visible landmarks in the raw imaging data. The ($E_o$, $N_o$) coordinates are determined using a pattern recognition algorithm as defined in, for example, U.S. Pat. Nos. 4,688,092 and 4,746,976 that matches ground features such as coastlines in the earth raw images with predetermined landmark chips. This matching process can be performed manually or automatically either on the ground or onboard the satellite.

The IR landmark measurements (60) represent the (East, North) angular location ($E_o$, $N_o$) of IR landmarks in the raw imaging data. The ($E_o$, $N_o$) coordinates are determined using a pattern recognition algorithm as defined in, for example, U.S. Pat. Nos. 4,688,092 and 4,746,976 that matches ground features such as coastlines in the earth raw images with predetermined landmark chips. This matching process can be performed manually or automatically either on ground or onboard the satellite.

The range measurements (70) represent the distance between the satellite and a ground station tracking the satellite. Range can be determined by various types of equipments and methods known in literature.

The i−1 iteration ParSEC solution (80) represents the corrected measurement coordinates ($E_{i-1}$, $N_{i-1}$) obtained after i−1 repeats of the ParSEC determination process (80) to (160). These corrected measurements coordinates are obtained in terms of the raw measurement ($E_o$, $N_o$) coordinates shown in (40), (50), and (60) and the ($a_{oi}$, $a_1$ . . . , $a_5$, $b_o$, $b_1$ . . . $b_5$) coefficients whose values equal (0.0, . . . ,0,0, 0, . . . ,0) for the first iteration (i=1). The ($E_{i-1}$, $N_{i-1}$) represent the raw measurement ($E_o$, $N_o$) angular locations corrected for systematic errors. Also, these ($E_{i-1}$, $N_{i-1}$) represent the angular location used to calculate the next iteration measurement residuals (100) through (130).

The Orbit & Attitude solution (90), which results from the operation of the ParSEC system, represents the output of the orbit and attitude determination process consisting of the orbit position and velocity and the imaging system optical axis orientation as functions of time. This solution is needed for image navigation and registration (INR). An accurate O&A and INR are essential for accurate weather forecasting including wind velocity calculation from cloud motion prediction.

The measurement residuals (100) through (130) represent the difference between the actual measurement (East, North) angular location ($E_{i-1}$, $N_{i-1}$) [=($E_o$, $N_o$) in the raw image coordinate system for the first iteration i=1] and its predicted location ($E_{p,\,i-1}$, $N_{p,\,i-1}$, based on the orbit and attitude solution (90). Therefore, this difference is seen to depend on the accuracy of the orbit and attitude determination system (OADS) (10) process and how large the errors are in the orbit model (20), attitude model (30) and other systematic errors. Orbit and attitude modeling error are minimized by design and systematic errors are determined by measurements prior to launch. Accurate determination of these systematic errors, however, would require purchase of expensive test equipment and would consume a significant period of time (out of critical test schedule) to make these measurements on the ground before the satellite is launched. In addition, after the satellite is launched, it would require a time consuming on orbit testing to refine the systematic error values previously determined on the ground before launch. The current invention (80) through (160) avoids the purchase of this expensive test equipment and the associated time consuming testing. Instead it uses a ParSEC algorithm, as depicted in, for example, (80)-(160) in FIG. 1 based on offline least squares, to estimate these systematic errors from several days of measurement residuals. This ParSEC correction process can be easily repeated several times (e.g., one a month) if necessary throughout the satellite life to account for the variability of the ParSEC correction coefficients over time. In this case, the ith iteration is the repeat of the ParSEC process after, for example, the ith month of on-orbit operation. Therefore, this offline ParSEC process significantly improves the accuracy of satellite weather forecasting at the lowest possible cost and is most efficiently employed after launch when actual observations are employed.

Systematic errors can be represented by a combination of trigonometric functions Sin E, Cos E, Sin N, and Cos N with coefficients of less than about 1000 microradians. Also, because the field of regard of imaging systems in geosynchronous orbits is bounded by (E, N)≈(±12°,±11°), the trigonometric functions Sin E, Cos E, Sin N, and Cos N can be approximated by sin E≈E, Cos E≈1−0.5 $E^2$, sin N≈N and Cos N≈1−0.5 $N^2$. In this case, the approximation error using the power series in FIG. 5≈1000*$|E|^3$/6=1000* $(12*0.017453)^3/6$ ≈1.5 microradians which is insignificant compared to the original about 1000 microradians systematic error. That is, quadratic power series E and N can quite accurately model sinusoidal systematic errors.

The ParSEC coefficient determination algorithm (140) represents, for example, a least squares algorithm that determines the 12 coefficients for each of star, visible landmark, IR landmark and earth edges measurements using the power series in FIG. 5. In this power series, (_E, _N) represents the (East-West, North-South) correction terms (shown for the star measurements in FIG. 5) and (E, N) represent the measurement angular coordinates such that E is positive east and negative west and N is positive north and negative south.

The ith ParSEC iteration (150) represents the corrected measurement angular coordinates ($E_i$, $N_i$) obtained after the ith repeat of the ParSEC determination process. These coordinates are obtained in terms of the previous iteration ($E_{i-1}$, $N_{i-1}$) coordinates and the ith iteration ($a_{oi}$, $a_{1i}$, $a_{5i}$, $b_{o1}$, $b_{1i}$, ... $b_{5i}$) coefficients obtained by the coefficient determination algorithm (140).

The ParSEC coefficient determination algorithm (160) represents conversion of the ($E_i$, $N_i$) in terms of ($E_{i-1}$, $N_{i-1}$) coordinates and ($a_{oi}$, $a_{1i}$, ..., $a_{5i}$, $b_{o1}$, $b_{1i}$, ... $b_{5i}$) coefficients into ($E_i$, $N_i$) in terms of raw image ($E_o$, $N_o$) coordinates and ($a_{oi}$, $a_1$, ..., $a_5$, $b_o$, $b_1$, ..., $b_5$) coefficients using the algorithm shown in FIG. 2.

In FIG. 2 there is recited the ParSEC $i^{th}$ iteration coefficients. As seen in FIG. 2, for i≧1, the ith ParSEC iteration (150) is given by the expressions $E_i=E_{i-1}-F(E_{i-1}, N_{i-1}, \vec{C}a_1)$ and $N_i=N_{i-1}-F(E_{i-1}, N_{i-1}, \vec{C}b_i)$. These are converted by the ith ParSEC algorithm (160) to $E_i=E_o-F(E_o, N_o, \vec{C}a_o)$ and $N_i=N_o-F(E_o, N_o, \vec{C}b_o)$ where $\vec{C}a_1=(a_{oi}, a_{1i}..., a_{5i})$, $\vec{C}b_1=(b_o, b_1..., b_5)$, $\vec{C}a_o=(a_o, a_1, ..., a_5)$, and $\vec{C}b_0=(b_o, b_1, ..., b_5)$. The six coefficients $a_o$ through $a_5$ are thereafter defined as shown, as are the coefficients $b_o$ through $b_5$.

The $\Delta a_o$ to $\Delta a_5$, $\Delta b_o$ to $\Delta b_5$ are indicated to be the numerical adjustment of the previous ParSEC coefficients with current ParSEC (ith) iteration coefficients. It is noted that these adjustments are done numerically based on the above formulas and also that convergence is achieved when $\Delta a_o$ to $\Delta a_5$, $\Delta b_o$ to $\Delta b_5$ become insignificant.

In FIG. 3 there is depicted the inverse ParSEC correction. The ParSEC correction is first set out in terms of ΔE and ΔN, then the inverse ParSEC correction is set out in terms of ΔE' and ΔN'. Thereafter, a0' . . . a3', as well as b0' . . . b3' terms are defined.

It is noted that (E, N) depicts the East, North pixel location in the raw image; (E', N') depicts the East, North pixel location in the corrected image; and a0 . . . a5, b0 . . . b5 represent the ParSEC coefficients; and a0' . . . a5' and b0' . . . b5' represent the ParSEC inverse coefficients.

In FIG. 4 there is depicted the star measurement residuals before the ParSEC corrections are applied which clearly shows significant distortion due to systematic errors especially in the northwest corner. East-West and North-South star residuals (i.e., the difference between actual and predicted locations) are plotted vs. the actual East-West and North-South star angles found by the JGP (JAMI[1], Ground, Processor).

In FIG. 5 there is depicted the optimal star measurement ParSEC coefficients obtained from the star measurement residuals employing a least squares algorithm. The correction terms ΔE and ΔN are defined, as well as the 12 coefficients a0-a5 and b0-b5 for stars, for two cases. Case 1 is when the O&A solution (90) and star residual data over the period May 11, 2006-May 14, 2006 are used to determine the 12 coefficients, and Case 2 is when OADS solves for attitude solution only and the orbit is provided by a separate analysis and planning system. It is noted that the 12 coefficients for both cases are adequate for systematic distortion correction.

In FIG. 6 there is shown star measurement residuals after the application of ParSEC corrections are applied that clearly shows that the systematic errors have been greatly eliminated, resulting in a much clearer image. Again, as depicted, East-West and North-South star residuals are graphed against the JGP found star angle.

The ParSEC system of the instant invention may be applied to any suitable imaging system and, more specifically, to all imaging systems that exhibit systematic distortion regardless of sensing type (remote or in situ) or imaging media (photons or charge particles) and is further applicable to corrected imaging of any celestial body currently detectable to remove distortion and systematic error from the imaging system employed. A typical ParSEC system may employ a combination of software and hardware where the algorithm may be expressed in software and the hardware may comprise computers. Typical imaging systems include scanning systems, CCD systems, x-ray, spectroscopic, xerographic and the like.
[1]JAMI=Japanese Advanced Meteorological Imager Any suitable camera may be employed in the system of the instant invention. Typical cameras include CCD, x-ray, xerographic, photographic and the like.

Any suitable satellite may be employed in the system of the instant invention. Suitable satellites includes 3-axis and spin-stabilized satellites that can be deployed in LEO (low earth orbit), MEO (middle earth orbit), HEO (high earth orbit) or GEO (geosynchronous earth orbit).

With regard to variations, combinations, permutations, modifications and substitutions for this ParSEC determination algorithm, they may comprise the use of real-time Kalman filters instead of offline least squares algorithm; providing the at least about 12 coefficients as function of time instead of constants; and expressing the measurement residuals in terms of the well known nth order Taylor Series appearing in, for example, the text "Statistical Orbit Determination" by Byron D. Tapley et al, published by Elsevier Press.

$$\Delta E = F(E, N)$$
$$= \sum_{i=0}^{n} \frac{1}{i!}\left(E\frac{\partial}{\partial E} + N\frac{\partial}{\partial N}\right)^i F$$
$$= a0 + a1*E + a2*N + a3*E*N + a4*E^2 + a_5*N^2 + ...$$

$$\Delta N = G(E, N)$$
$$= \sum_{i=0}^{n} \frac{1}{i!}\left(E\frac{\partial}{\partial E} + N\frac{\partial}{\partial N}\right)^i G$$
$$= b0 + b1*E + b2*N + b3*E*N + b4*E^2 + b_5*N^2 + ...$$

Where
(E, N) are the two Taylor Series variables and n can be any number:
For n=1 and E or N used as variables, the number of coefficients=4
For n=1 and E and N used as variables, the number of coefficients=6
For n=2 and E or N used as variables, the number of coefficients=6
For n=2 and E and N used as variables, the number of coefficients=12
For n=3 and E or N used as variables, the number of coefficients=8

For n=3 and E and N used as variables, the number of coefficients=20

As seen in FIG. 1, inputs (40) through (70) are received in O&A block diagram (10) through (30) employing prior art techniques to output (110) through (130) to the ParSEC coefficient determination algorithm (140) where they are corrected by said algorithm and output corrected equations (150) containing the ParSEC coefficients in the ith iteration. The ith ParSEC iteration (150) is then converted by block (160) to get solution (80) that is used for correction of the stars and landmarks (40) through (60) observed from the raw images and used as the i−1 iteration of the (90) through (160) ParSEC process. The output from the (10) through (30) block, labeled (90), provides the resulting corrected O&A solution. This solution along with the 12 ParSEC coefficients (80) is transmitted to an image product generation processor (not shown in FIG. 1) that resamples the raw imagery data into accurately geo-located user products (e.g., HRIT/LRIT).

Having described the ParSEC system in terms of the specification and drawings above, the following example will further exemplify the principle of the instant invention:

Step 1 collects actual measurements such as star (40), visible landmark (50) and IR landmark (60) measurements from imaging camera on moving satellite over a long period of time (e.g., one week);

Step 2 uses the actual measurements (40) to (60) plus range (70) and possibly earth edges (see U.S. Pat. No. 6,023,291) to determine, for example, orbit and attitude solution (90) using the Orbit & Attitude Determination System (OADS) (10) and orbit model (20) and attitude model (30);

Step 3 computes predicted locations (Ep, Np) for the measurements in step 1 above (e.g., star, visible landmark, IR landmark, and possibly earth edges) using, for example, the Orbit and Attitude (O&A) solution (90) from the OADS (10);

Step 4 computes the measurements residuals (actual-predicted) locations (100) consisting of star residuals (110), visible landmark residuals (120), IR landmark residuals (130), and possibly earth edges;

Step 5 fits measurement residuals using the ParSEC coefficient determination algorithms (140) to determine the best estimate (150) of the 12 ParSEC coefficients for each type of measurement (i.e., star, visible landmark, IR landmark, and possibly earth edges);

Step 6 uses the conversion algorithm (160) to convert solution (150) into solution (80) in terms of position coordinates ($E_o$, $N_o$) which is consistent with the position coordinates ($E_o$, $N_o$) in the raw observations (40) to (50);

Step 7 uses the 12 ParSEC coefficients in the solution (80) to correct the East-West and North-South location of the actual star, visible landmark and IR landmark measurements (40) to (60), and possibly earth edges in step 1 above. This correction improves the orbit and attitude determination solution (90) and, therefore, improves accuracy in steps 2, 3 and 4 above;

Step 8 repeats steps 5 through 7 until the 12 ParSEC coefficients stabilize (i.e., the difference between two successive iterations becomes insignificant);

Step 9 implements the visible landmark 12 ParSEC coefficients in user image product generation processor to correct the location of the raw visible imagery pixels to better match the fixed coastline overlay grid and achieve more accurate geo-location in user image products such as HRIT/LRIT before transmittal to users;

Step 10 implements the IR landmark 12 ParSEC coefficients in user image product generation processor to correct the location of the raw IR imagery pixels to better match the fixed coastline overlay grid in user image products such as HRIT/LRIT before transmittal to users; and Step 11 uses the 12 ParSEC coefficients in reverse (shown in FIG. 3) to determine (a) raw pixel locations ($E_o$, $N_o$) from pixel locations (E, N) in user product such as HRIT/LRIT and (b) star observation raw locations ($E_o$, $N_o$) from the locations (Es, Ns) based on OADS solution (90).

The system of the instant invention may also be used to determine systematic distortion errors of raw imaging data for any remote sensing system that views the earth from a moving satellite over bounded field of regard (FOR) angles by expressing the measurement residuals in terms of a power series of two angles in the FOR coordinate system. Further, the ParSEC algorithm system of the instant invention may be employed to determine systematic distortion errors of raw imaging data from a camera that views the earth from moving aircraft over bounded field of regard (FOR) angles by expressing the measurement (landmark features) residuals in terms of a power series of two angles in the camera FOR coordinate system. In addition, the functional form of the ParSEC correction system of the instant invention may not be limited to do second order non-linear polynomial function presented in the examples herein. The specific functional form may be suggested by the problem that the physics and the data itself represent and could include higher order polynomial terms, periodic terms or almost any other functional form. In addition, ParSEC could be used to partially replace or minimize the ground testing of instruments to characterize distortion precisely on the ground with in-orbit tuning to remove the distortion parametrically. This would result in preserving schedules and cost savings in system development.

While the present invention has been particularly described with respect to a preferred sequence of process steps in its method claims and/or certain elements in its preferred embodiment, it will be understood that the invention is not limited to these particular methods and/or apparatus described in the preferred embodiments, the process steps, the sequence, or the final structures depicted in the drawings. On the contrary, it is intended to cover all alternatives, modifications, and equivalents as may be included within the spirit and scope of the invention defined by the appended claims.

In the near future, for example, it is contemplated that remote sensing telescope optics will have actively controlled mirror elements which will include rigid body and continuously deformable mirrors. The ParSEC system of the instant invention may be employed to compute distortion compensation in multi-element mirrors. Several currently proposed space telescopes are designed to be focused in space, resulting in cost/schedule savings for ground processing. An onboard ParSEC tool such as defined in the instant invention will enable such telescopes to self-adjust their imaging parameters without human intervention, resulting in further start-up cost reductions.

ParSEC correction technology of the instant invention may also be implemented to correct for systematic distortions in highly microscopic in situ instrumentation regardless of the media being studied (photons or charge particles). Such imaging instrumentation is commonly used in the study of surface physics/chemistry, including x-ray photoelectron spectroscopy, Auger electron spectroscopy and ion scattering spectroscopy. There is currently a requirement to provide high precision image capable versions of these instruments, thereby providing the ParSEC correction system of the instant invention another application in removing systematic distortions without the need for costly study and modification.

What is claimed is:

1. A method of providing improved image navigation and registration (INR) for an imaging system that exhibits systematic distortion comprising:
   collecting imagery data comprising measurements of star and landmark locations using the imaging system;
   processing, via at least one processor, actual and predicted star and landmark location data using Parametric Systematic Error Correction (ParSEC) comprising about 12 correction coefficients to iteratively estimate the about 12 ParSEC coefficients for each location measurement; and
   correcting, via at least one processor, location measurements using the estimated ParSEC coefficients.

2. The method as defined in claim 1, wherein said about 12 coefficients are determined by an iterative estimation algorithm comprising measured residuals associated with each measurement.

3. The method as defined in claim 2 further comprising applying the about 12 coefficients to correct the measured residuals.

4. The method as defined in claim 1, wherein INR measurements include stars, visible landmarks, infrared (HO landmarks and earth edges.

5. The method as defined in claim 2, wherein said iterative estimation algorithm comprises least squares to determine the about 12 correction coefficients.

6. The method as defined in claim 2, wherein said iterative estimation algorithm comprises Kalman Filter to determine the about 12 correction coefficients.

7. The method as defined in claim 2, wherein said measured residuals comprise the difference between the actual measurement of East-West and North-South coordinates from imagery data and predicted East-West and North-South coordinates based on orbit and attitude solution.

8. The method as defined in claim 1, wherein said applying the about 12 coefficients improves orbit and attitude determination.

9. The method as defined in claim 1, wherein said applying the about 12 coefficients improves remapping of raw image pixels to better match an actual coastline to a fixed coastline grid.

10. The method as defined in claim 1, wherein said applying the about 12 coefficients improves image products to facilitate High Rate Information Transmission (HRIT) and Low Rate Information Transmission (LRIT).

11. The method as defined in claim 1, wherein said applying the about 12 coefficients improves image products resulting in improved weather forecasting, including wind velocity and temperature.

12. A method of providing improved image registration and navigation (INR) for imaging systems that exhibit systematic distortion comprising;
   collecting actual measurements selected from a group including star, visible landmarks, infrared (IR) landmark and earth edges measurements from an imaging camera positioned on a moving satellite over about a one day period of time;
   computing, via at least one processor, measurement residuals as the difference between actual and predicted locations;
   fitting measurement residuals employing a Parametric Systematic Error Correction (ParSEC) coefficient determination algorithm in at least one processor to determine a best estimate of the about 12 ParSEC coefficients for each type of measurement;
   employing the about 12 ParSEC coefficients to correct locations of each of an actual star, visible landmark, infrared (HO landmark or earth edge measurement; and
   repeating the fitting measurement residuals step until the about 12 ParSEC coefficients stabilize.

13. The method as defined in claim 12, wherein visible landmark coefficients correct locations of raw visible imagery pixels to better match a fixed coastline overlay grid.

14. The method as defined in claim 12, wherein IR landmark coefficients correct locations of raw IR imagery pixels to better match a fixed coastline overlay grid.

15. The method as defined in claim 14, wherein more accurate geo-location in image products such as High Rate Information Transmission HRIT) and Low Rate Information Transmission (LRIT) is obtained before transmittal to users.

16. The method as defined in claim 12, wherein the about 12 ParSEC coefficients are applied in reverse to modify future expected star observation locations in order to better predict a star's location in lieu of adverse systematic errors affecting an imaging system.

17. The method as defined in claim 12, further comprising:
   employing the actual measurements to determine an orbit and attitude solution using an orbit and attitude determination system (OADS); and
   computing predicted locations for the measurements employing an orbit and attitude (O&A) solution from the OADS.

18. The method as defined in claim 1, wherein said correcting measured imagery data comprises:
   processing measured imagery data comprising INR measurements derived from the imaging system using Parametric Systematic Error Correction (ParSEC) comprising about 12 correction coefficients;
   determining the about 12 correction coefficients; and
   applying the about 12 correction coefficients to each measurement to correct for systemic distortion exhibited by the imaging system.

* * * * *